(12) United States Patent
Warren, Jr. et al.

(10) Patent No.: US 7,148,448 B2
(45) Date of Patent: Dec. 12, 2006

(54) MONITORED LASER SHOCK PEENING

(75) Inventors: Richard Edwin Warren, Jr., Schenectady, NY (US); Phillip Randall Staver, Hagaman, NY (US)

(73) Assignee: General Electric Company, Niskayuna, NY (US)

( * ) Notice: Subject to any disclaimer, the term of this patent is extended or adjusted under 35 U.S.C. 154(b) by 132 days.

(21) Appl. No.: 10/700,063

(22) Filed: Oct. 31, 2003

(65) Prior Publication Data

US 2005/0092724 A1    May 5, 2005

(51) Int. Cl.
B23K 26/02 (2006.01)
(52) U.S. Cl. ............... 219/121.83; 219/121.84
(58) Field of Classification Search ........... 219/121.83, 219/121.84, 121.85, 121.6, 121.82; 374/32, 374/1, 2
See application file for complete search history.

(56) References Cited

U.S. PATENT DOCUMENTS

| | | | |
|---|---|---|---|
| 5,730,811 A | | 3/1998 | Azad et al. |
| 5,742,028 A | | 4/1998 | Mannava et al. |
| 5,744,781 A | | 4/1998 | Yeaton |
| 5,756,965 A | | 5/1998 | Mannava |
| 5,932,120 A | | 8/1999 | Mannava et al. |
| 5,948,293 A | | 9/1999 | Somers et al. |
| 5,951,790 A | | 9/1999 | Mannava et al. |
| 5,980,101 A | * | 11/1999 | Unternahrer et al. ......... 374/32 |
| 5,987,042 A | * | 11/1999 | Staver et al. ................. 372/30 |
| 6,002,706 A | * | 12/1999 | Staver et al. ............... 372/108 |
| 6,005,219 A | | 12/1999 | Rockstroh et al. |
| 6,021,154 A | | 2/2000 | Unternahrer |
| 6,075,593 A | | 6/2000 | Trantow et al. |
| 6,094,260 A | | 7/2000 | Rockstroh et al. |
| 6,130,400 A | | 10/2000 | Rockstroh |
| 6,159,619 A | | 12/2000 | Rockstroh et al. |
| 6,197,133 B1 | | 3/2001 | Unternahrer et al. |
| 6,215,097 B1 | | 4/2001 | Mannava |
| 6,254,703 B1 | * | 7/2001 | Sokol et al. ................. 148/508 |
| 6,281,473 B1 | | 8/2001 | Wright, III et al. |
| 6,296,448 B1 | | 10/2001 | Suh et al. |
| 6,333,488 B1 | | 12/2001 | Lawrence et al. |
| 6,422,082 B1 | | 7/2002 | Suh |
| 6,479,790 B1 | | 11/2002 | Graham et al. |
| 6,512,584 B1 | * | 1/2003 | O'Loughlin et al. ........ 356/388 |
| 6,548,782 B1 | * | 4/2003 | Dykes et al. .......... 219/121.85 |
| 6,559,415 B1 | | 5/2003 | Mannava et al. |
| 6,570,125 B1 | | 5/2003 | Suh et al. |
| 6,570,126 B1 | | 5/2003 | Suh et al. |
| 2003/0038123 A1 | | 2/2003 | Dykes et al. |
| 2003/0062350 A1 | | 4/2003 | Staver et al. |

OTHER PUBLICATIONS

EP Search Report, EP04256633, Feb. 7, 2005.

* cited by examiner

*Primary Examiner*—M. Alexandra Elve
(74) *Attorney, Agent, or Firm*—Penny A. Clarke; Patrick K. Patnode

(57) ABSTRACT

A pulse laser is configured for projecting a pulsed laser beam at a target site on a fluid film atop a workpiece for laser shock peening the workpiece. The fluid film is monitored by a probe laser which projects a probe laser beam at the target site, and an optical detector which detects reflection of the probe beam from the target site. The pulse laser is coordinated by the detector in order to emit the pulsed beam in response to the condition of the monitored film.

8 Claims, 3 Drawing Sheets

MONITORED LASER SHOCK PEENING

BACKGROUND OF THE INVENTION

This invention relates to surface peening of metal workpieces, and, more specifically, to laser shock peening thereof.

Fatigue strength of metal parts may be improved by introducing compressive residual stresses in the surface of such parts. This is typically accomplished by shot peening the surface with small metal shot to plastically deform and compress the metal surface layer. The metal surface must be uniformly peened to ensure the efficacy of the peening process.

Laser shock peening (LSP) is a modern development in peening, and uses a high peak-power laser to generate mechanical shock waves in order to produce compressive residual stresses in the metal surface. This process is performed by applying an absorbing material over the metal surface, such as black paint or tape, to absorb energy from the laser beam and produce a rapidly expanding or exploding plasma. The plasma produces a shock wave capable of plastically deforming the metal surface to introduce residual compressive stress in the surface.

LSP is substantially improved by locally confining the expanding plasma to concentrate the explosive pressure against the metal surface. This is typically accomplished by covering the metal surface with a thin confining layer of water which flows continuously over the surface and is thus replenished as LSP is conducted.

High power in the laser is produced by operating the laser in pulse-mode at a suitable repetition rate or pulse rate. In this way, the energy in each pulse may be maximized for maximizing the shock peening effect, while permitting replenishment of the confining water film between successive laser beam pulses.

Since each laser pulse produces a small explosion at the peening site, the water film is temporarily disrupted. Accordingly, the repetition rate of the power laser must be sufficiently low to ensure that a suitably thick and smooth water film is re-established after each peening pulse for efficiently confining successive pulse shots. If the repetition rate is excessive and the water film is not re-established promptly, the succeeding laser pulse will not be suitably confined, thus degrading the peening process and reducing its overall efficiency.

A high power pulse-mode laser configured for LSP is optimized for performance under a high average power thermal loading. Such pulse lasers operate at maximum efficiency at a corresponding pulse rate. However, operating the pulse laser below its designed pulse rate to ensure re-establishment of the confinement film results in poor laser performance.

There is presently no practical method of monitoring the quality of the water film to ensure its effectiveness for LSP. Care must be taken in the LSP process to ensure that a suitable film of water flows over the workpiece surface and is suitably re-established after each laser pulse. This is presently accomplished by visual observation of the water film and limiting the pulse rate to no greater than about one pulse ever four seconds to ensure re-establishment of a suitable confinement water film.

Accordingly, it is desired to provide a laser shock peening system including automatic monitoring of the confinement film to increase the repetition rate of the laser pulses and improve efficiency of the LSP process.

BRIEF SUMMARY OF THE INVENTION

A pulse laser is configured for projecting a pulsed laser beam at a target site on a fluid film atop a workpiece for laser shock peening thereof. The fluid film is monitored by a probe laser which projects a probe laser beam at the target site, and an optical detector detects reflection of the probe beam from the target site. The pulse laser is coordinated by the detector in order to emit the pulsed beam in response to the monitored film.

DETAILED DESCRIPTION OF THE INVENTION

Figure 1:
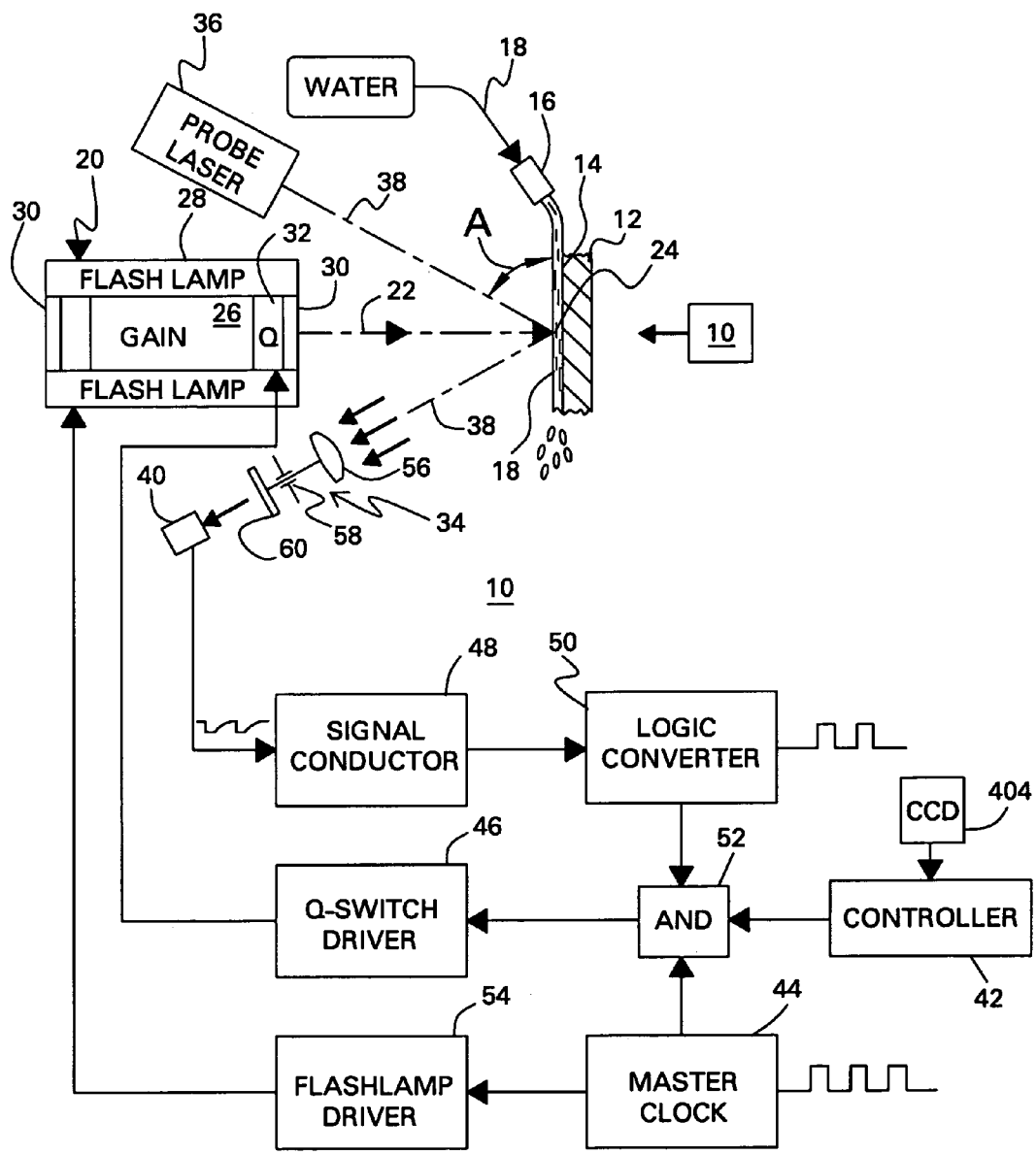
FIG. 1 is a schematic representation of a laser shock peening system in accordance with an exemplary embodiment of the invention.

In FIG. 1, a laser shock peening (LSP) system 10 in accordance with an exemplary embodiment of the invention is shown configured for laser shock peening one side of a metal workpiece 12 in order to introduce plastic deformation and resulting compressive residual stress.

An identical system 10 is illustrated schematically in the box to the right of workpiece 12 in FIG. 1 for simultaneously peening the opposite side of the workpiece in a preferred embodiment which balances the compressive stresses introduced into the workpiece. Accordingly, the system may be used over any surface of a metal workpiece either alone or in conjunction with peening of opposite surfaces thereof as desired.

Figure 2:
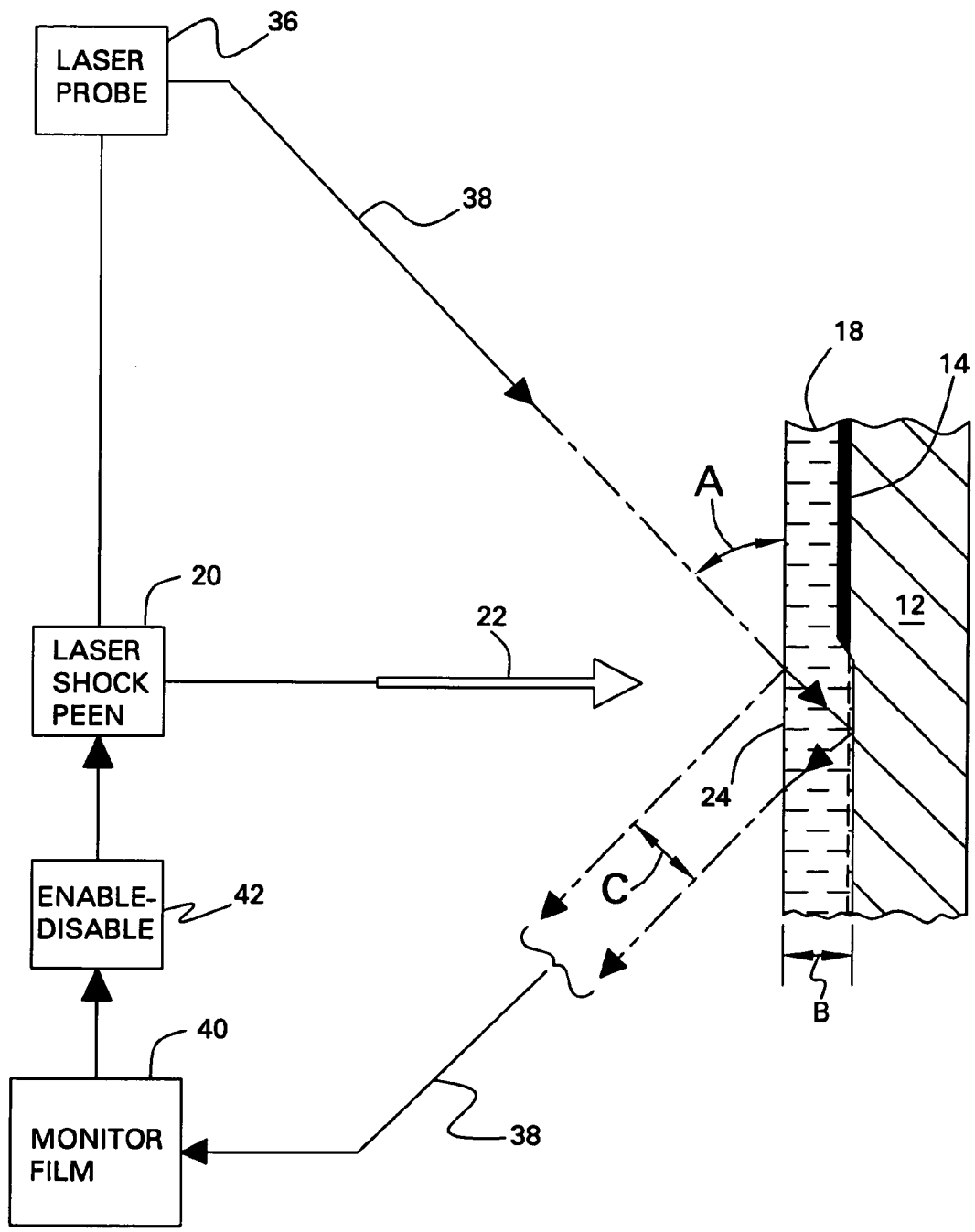
FIG. 2 is an enlarged view of the workpiece undergoing laser shock peening in FIG. 1, illustrating an exemplary method of the peening process.

Workpiece 12, illustrated in enlarged part in FIG. 2, may have any conventional configuration for which laser shock peening of the outer surface of the workpiece is desired. LSP is effected by initially providing a light-absorbing or ablative layer 14 over the exposed surface of the workpiece to absorb light energy and create the desired exploding plasma in the process. The absorbing layer 14 may take any conventional form, such as having black paint or tape applied over the exposed surface of the workpiece.

As shown in FIG. 1, suitable means including one or more discharge nozzles 16 are provided for discharging water 18 over the exposed surface of the workpiece atop or along light-absorbing layer 14 during operation. If both surfaces are to be simultaneously peened, water would also need to be discharged over the opposite surface of the workpiece, typically, in the same manner. The workpiece may be vertically oriented so that the water simply falls vertically downwardly over the workpiece surface to create a relatively thin film thereon. Water film 18 effects a liquid confinement layer atop absorbing layer 14 for locally confining the shock peening plasma developed during operations.

A peening laser 20 generates and projects a pulsed laser beam 22 at a target or work site 24 on the fluid film atop the workpiece. The peening laser is preferably a high peak-power laser operated in pulse-mode for producing high energy laser pulses which are projected as a train of pulses to form the periodic laser beam directed at target site 24.

Either the laser or the workpiece may be moved to enable the laser beam to traverse the entire exposed surface of the workpiece requiring LSP. Such relative movement between the laser beam and workpiece may be effected in any conventional manner by mounting the laser or the workpiece in a suitably driven carriage.

Peening laser 20 may be of any conventional configuration, such as a Neodymium doped glass (Nd:glass) laser operated in a Q-switch mode with an exemplary power output greater than about 1 gigawatt. For example, peening laser 20 preferably includes a laser slab or rod 26 of suitable gain material for being optically pumped to generate the laser beam.

Laser rod 26 is mounted in a cooled housing containing opposing flashlamps 28 of any conventional configuration for optically pumping the laser rod. A pair of end-mirrors 30 are disposed at opposite ends of the laser rod for creating a resonator or oscillator cavity in which the laser beam is generated. Conventional optical elements, including a polarizer, are employed in the resonator cavity for generating the laser beam. For example, a Q-switch 32 in the form of a Pockels Cell is used in the resonator cavity for use in generating high pulse power from the laser.

Q-spoiling or Q-switching in high powered pulse lasers is conventional and further details thereof may be found in the book entitled "Solid-State Laser Engineering", by W. Koechner, fourth edition, 1996, Springer-Verlag, New York, and particularly in Chapter 8 which is specific to Q-switching.

Peening laser 20 is preferably directed substantially perpendicularly toward workpiece 12 at target site 24. As shown greatly enlarged in FIG. 2, pulse beam 22 is directed through thin water film 18 to impact the underlying light absorbing layer 14 which absorbs the laser beam energy and effectively explodes instantaneously to generate a plasma locally confined by film 18.

The exploding plasma generates shock waves which plastically deform the exposed surface of the workpiece under the target site, leaving a small surface indentation having residual compressive stress. The lower portion of workpiece 12 illustrated in FIG. 2 has undergone LSP, with peening laser beam 22 being traversed vertically for continuing the LSP process vertically as well as laterally across the exposed surface of the workpiece as desired for providing a uniform plastically deformed compressive layer therein.

While water film 18 may be channeled over the exposed workpiece surface in any conventional manner to create a suitably thin confinement layer, the individual laser pulses locally explode and disrupt the continuity of film 18. It is therefore not desirable to discharge a succeeding laser pulse until the fluid film is re-established at the corresponding target site 24. Furthermore, various irregularities in the surface of the workpiece itself may cause local disruption of the fluid film, and it is not desired to emit the laser pulses if quality of the fluid film is insufficient or abnormal in any manner. Accordingly, the LSP system 10 illustrated in FIG. 1 includes means in the form of a monitor 34 to automatically monitor the quality of fluid film 18 at target site 24 for use in controlling peening laser 20 when the fluid film is in a normal state of sufficient quality as desired for the particular LSP process being used.

Monitor 34 preferably includes a probe laser 36 for generating and projecting a probe laser beam 38 at target site 24 for detecting the quality of fluid film 18. The target site itself may be as small as the impact site for peening beam 22 or may be suitably larger to ensure adequate quality of the fluid film for confining exploding plasma with maximum effectiveness. Probe laser 36 may be of any conventional form such as a helium neon (HeNe) laser, or a diode laser, preferably emitting a continuous wave laser beam 38 focused at the target site.

The monitor also includes an optical detector 40, such as a solid-state photodetector that is optically aligned with the target site for detecting reflection of probe beam 38 therefrom. Probe laser 36 and optical detector 40 are aligned with target site 24 typically at identical oblique angles A relative to the plane of the fluid film. In contrast, peening laser beam 22 is preferably directed perpendicularly to the plane of the fluid film.

System 10 further includes means in the form of an electrical controller 42 operatively coupled to peening laser 20 and optical detector 40 for establishing the pulsed laser beam in response to the monitored condition or quality of fluid film 18.

Peening laser 20 illustrated in FIG. 1 generates pulsed laser beam 22 as a train of pulses produced at a suitable pulse repetition rate. Q-switch 32 is conventionally operated for switching the laser during optical pumping of laser rod 26 at a fixed pumping rate and corresponding thermal condition. In this way, the operating efficiency of pulse laser 20 may be maximized or optimized at the specific pulse repetition rate desired for increasing the rate of LSP processing.

In a preferred embodiment, the pulse repetition rate of peening laser 20 is substantially greater than one cycle every four seconds, typically found in conventional LSP, and is preferably at least ten cycles per second (10 hertz). This relatively high repetition rate in the high-power pulse laser may be designed for maximum efficiency and thermal loading condition, and coordinated with the LSP process for maximizing peening area coverage over time.

With such a relatively high pulse repetition rate, it is important to monitor the condition of fluid film 18 after correspondingly short time intervals to ensure that the fluid film has re-established after each laser pulse and thereby eliminate the risk of firing laser pulses through insufficient fluid film, which would waste such pulses and reduce the overall efficiency of the LSP process.

As shown in FIG. 1, the controller 42 is preferably operatively coupled to Q-switch 32 for emitting peening laser beam 22 in coordination with the monitored condition of the fluid film.

In normal operation, Q-switch 32 is controlled for generating the desired laser beam pulses in a periodic train. However, by monitoring the condition of fluid film 18 using optical detector 40, controller 42 may be additionally used for selectively enabling Q-switching in pulse laser 20 only when a normal film 18 is detected at target site 24.

FIG. 2 illustrates schematically, with labeled functions of the apparatus of FIG. 1 bearing like reference numbers, an exemplary method of laser shock peening workpiece 12 in response to the monitored condition of fluid film 18. A relatively smooth (that is, the filmed surface has a period of motion sufficiently slow that the laser monitoring discussed above can be used to assess the liquid film status) water film 18 may be formed in any suitable manner, with a thickness B of about 1.0 mm for example. Pulse laser 20 is then operated to emit a train of laser pulses 22 at target site 24 as the pulse train is traversed across the surface of the workpiece. Each laser pulse rapidly heats light absorbing layer 14 for generating the explosive plasma and correspondingly peening the workpiece surface.

Fluid film 18 at target site 24 is continuously monitored by projecting probe laser beam 38 at the target site and detecting reflected light therefrom. In a simple embodiment, the presence of film 18 at target site 24 will reflect the probe laser light energy at maximum magnitude to optical detector 40. This maximum magnitude of detected light indicates that the pulse laser may continue to operate in normal fashion.

Upon the disruption of the fluid film at target site 24 by a plasma explosion, for example, immediately following the previous laser pulse, little if any light from probe laser 38 will be reflected to optical detector 40. During this abnormal condition of the fluid film, controller 42 may be used to disable Q-switch 32 and prevent discharge of the laser pulses until the fluid film is suitably re-established and reflecting sufficient probe light to detector 40.

In the embodiment illustrated in FIG. 1, controller 42 is specifically configured for logically coupling pulse laser 20 and optical detector 40 of monitor 34 for enabling Q-switching when fluid film 18 is in a normal condition, i.e., smooth and uninterrupted at the target site, as well as for disabling the Q-switching when the film is in an abnormal condition, i.e., disrupted or discontinuous at the target site, as determined by monitor 34. As used herein, "configured," "adapted to," and the like refer to a digital or an analog device (such as a programmable computer, application specific integrated mount, or the like) that operates in accordance with an algorithm or method of processing input data to provide a desired output signal.

In the embodiment shown in FIG. 1, the controller 42 includes a master clock 44 produces a periodic clock signal, or train of relatively high and low voltage values, to effect the desired pulse repetition rate for pulse laser 20. The system further includes a conventional electrical driver 46 for Q-switch 32 which, in the prior art, would be otherwise coordinated with master clock 44 for producing the laser beam pulses at the desired repetition rate. However, in the embodiment of FIG. 1, controller 42 is modified to cooperate with optical detector 40 so as to enable Q-switch driver 46 when the detector detects that the film is normal, and to disable driver 46 when the detector detects that the film is abnormal.

The controller is preferably configured in accordance with a feature of the present invention for synchronizing the output signal of monitor 34 to the pulse rate of the pulse laser as controlled by driver 46. This is preferably effected by introducing an electrical signal conditioner 48 to maximize discrimination of the high and low voltage signal produced by optical detector 40 when monitoring the light from target site 24. The conditioner may include suitable amplifiers and bias removers to improve the electrical signal produced by optical detector 40. For example, when film 18 is smooth, detector 40 will produce a maximum voltage output due to the reflected light thereon. When the film is disrupted by a laser pulse generating the exploding plasma, the reflection of probe laser beam 38 is interrupted and detector 40 produces a correspondingly lower voltage output. This low voltage output will correspondingly rise to its maximum value upon re-establishment of the smooth film.

A logic converter 50 is operatively coupled to signal conditioner 48 for producing an output signal of relatively high voltage corresponding with the normal fluid film and indicative of a logical TRUE condition or, alternatively, a relatively low value signal corresponding with the abnormal fluid film and indicative of an opposite FALSE logic value. Thus logic converter 50 produces an output signal either high or low to correspond with the high and low signals from optical detector 40 corresponding with the normal and abnormal fluid flow conditions.

Controller 42 cooperates with a logical AND gate 52 operatively coupled to optical detector 40 by signal conditioner 48 and logic converter 50. The AND gate is operatively coupled to Q-switch driver 46 and master clock 44. In this way, Q-switch driver 46 is enabled for pulses at the desired pulse rate corresponding to clock pulses of master clock 44 in conventional manner, but the introduction of AND gate 52 synchronizes the Q-switch driver with operation of the optical detector 40 through the cooperating logic converter 50.

When optical detector 40 produces a relatively high output voltage corresponding with the normal fluid film condition, logic converter 50 correspondingly produces a high or TRUE value which, when combined with the signal from master clock 44 at AND gate 52, enables Q-switch driver 46 when the high peaks of the signals from logic converter 50 match the corresponding high peaks of the master clock signal. However, when optical detector 40 produces a low output voltage corresponding with the abnormal fluid film condition, logic converter 50 produces a low or FALSE condition which causes AND gate 52 to disable Q-switch driver 46 irrespective of the signal from the master clock.

Accordingly, by the introduction of monitor 34 and the cooperating AND gate 52, Q-switch driver 46 is enabled only when permitted by the monitor. In this way, pulse laser 20 may be designed and configured for maximum efficiency at the desired pulse rate and operated at that pulse rate, with pulse beam 22 being interrupted by disabling Q-switch driver 46 only when required for ensuring establishment of a normal (that is, a film sufficient to support the laser peening process described above).

Pulse laser 20 also includes a conventional flashlamp driver 54 coupled to master clock 44 for synchronized operation therewith. However, it is preferred to control pulse laser 20 using Q-switch driver 46 instead of flashlamp driver 54 in order to achieve maximum efficiency for the laser, which is optically pumped at a fixed pumping rate and thermal condition.

In the basic embodiment illustrated in FIG. 1, controller 42 is configured for controlling operation of the pulse laser 20 in response to relative strength or magnitude of the reflected probe beam 38 sensed by detector 40. A smooth water surface at the target site will best reflect the probe beam for reception by detector 40 with a correspondingly high measured reflection magnitude therefrom associated with the normal or smooth film, while an abnormal film disrupted, for example, by the previous laser pulse, will reflect little if any of the probe beam toward detector 40, causing the detector to measure a relatively low magnitude of reflected light.

Performance of optical detector 40 may be enhanced by introducing a focusing lens 56 optically aligned between detector 40 and target site 24 for collecting the reflected light and focusing it on the detector. A pinhole aperture 58 may be optically aligned between detector 40 and lens 56 to provide discrimination between the highly collimated specular reflection of the probe beam at the target site and the scattered or diffuse beam light from the disrupted target site immediately following a laser pulse explosion during LSP processing.

A narrow band-pass optical filter 60 may be optically aligned between detector 40 and aperture 58 for reducing or eliminating undesirable background light such as the broadband light emitted from the exploding plasma itself. Filter 60 preferably has a passing wavelength centered on the wavelength of probe laser beam 38 for ensuring detection of the probe laser light and not the unwanted background light.

As indicated above, signal conditioner 48 suitably conditions the resulting signal from optical detector 40 by distinguishing the relatively high and low magnitudes of the signal corresponding with normal and abnormal smoothness of water film 18. The conditioned signal is converted to a logical TRUE or FALSE voltage level at logic converter 50 and combined in logical AND gate 52 with the signal from master clock 44 to enable Q-switch driver 46 only when TRUE or normal signals are detected by optical detector 40. Conversely, driver 46 is disabled under FALSE or abnormal signals from detector 40 indicating that the film is temporarily insufficient for efficient LSP processing.

In the basic embodiment illustrated in FIGS. 1 and 2, the quality of water film 18 being detected may simply be its relative smoothness, which permits detectable reflection of probe beam 38 onto optical detector 40. To further improve the LSP process, it is desirable to measure in real time the actual thickness of water film 18, which should be greater than about 0.5 mm, for example. However, thickness measurement of film 18 must be accomplished in situ, in real time, and without disrupting the film itself. Although ultrasonic devices are often used for measuring thickness, typically of solid parts, when applied to measuring water thickness they would be invasive and disrupt the water film being measured.

Figure 3:
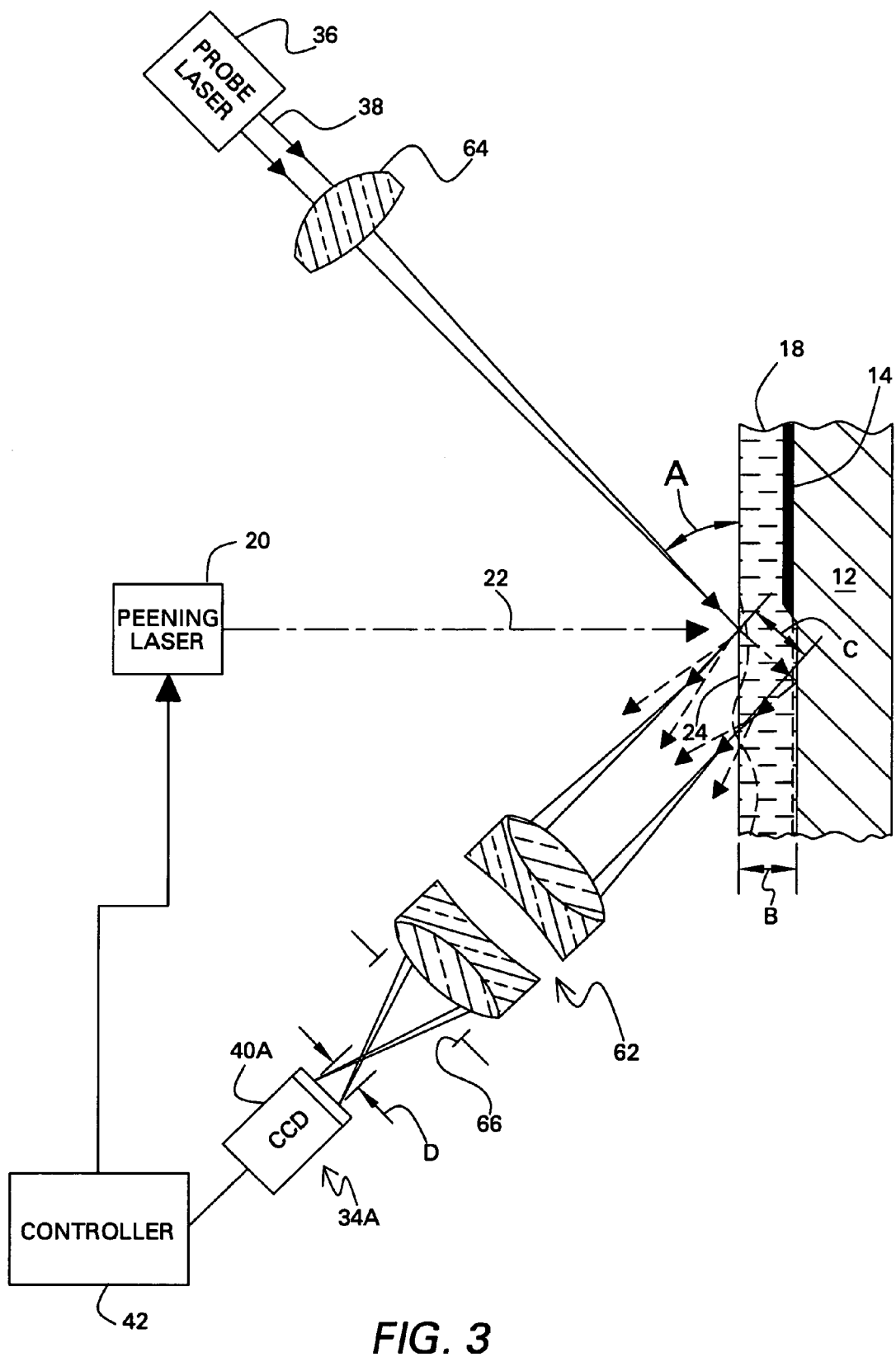
FIG. 3 is a schematic representation of the laser shock peening system of FIG. 1 in accordance with an alternative embodiment of the present invention.

Accordingly, a modification of a portion of LSP system 10 illustrated in FIG. 1 is shown in FIG. 3 to include an optical monitor 34A, specifically configured for measuring the thickness B of water film 18 at target site 24. A minimum thickness B of about 0.5 mm may be sufficient to correspond to a normal thickness desired for film 18, with a smaller or insufficient thickness corresponding to an abnormal film which typically occurs immediately following a laser pulse explosion at the target site.

As shown in FIG. 2, probe beam 38 is directed toward target site 24 at a suitable oblique incidence angle A which produces two reflections at the target site. A first reflection is simply specular reflection from the surface of the water film. The second reflection is the result of refraction of the incident beam into the water film, reflection from the interface with the workpiece and refraction outward from the surface of the film, so as to produce a beam that is generally parallel to the specular reflection but spaced therefrom by a displacement C.

By measuring displacement spacing C, the film thickness B may be determined from conventional optical analysis. Specifically, the spacing C between the two reflections is equal to the product of the film thickness B and the sine of twice the incidence angle A divided by the square root of the difference between the square of the index of refraction n for the water, i.e., n=1.33, and the square of the sine of the incidence angle. Thus $$C = B \sin 2A/(n^2 - \sin^2 A)^{1/2}.$$

A plot of this relationship indicates that the spacing C is always less than the film thickness B, which increases the difficulty of measuring small films in the range of a few hundred microns to about 1.0 mm thick. A suitable probe laser of the conventional HeNe type has a beam diameter of about 1.0 mm which is about equal to or greater than the desired thickness of the film.

Furthermore the water surface as illustrated in FIG. 2 is flat, when in practice it will likely include ripples which correspondingly converge or diverge the two reflections and alter the magnitude of the projected displacement spacing C. Additionally, typical workpiece surfaces are relatively rough, and the component of the probe beam reflected therefrom has correspondingly reduced magnitude compared to that of the specular reflection from the water surface. These difficulties, however, may be overcome by the embodiment of the invention illustrated in FIG. 3, in which a plurality of optical detectors in the form of a two-dimensional planar array 40A is optically aligned with target site 24 for detecting the reflected images. A cooperating imaging lens 62 is optically aligned between detector array 40A and target site 24 for focusing an image of the target site on the detector array. Imaging lens 62 includes a plurality of cooperating lenses for inverting and focusing the target site image on detector array 40A. For example, a four-lens group from a conventional photocopying machine was used in one tested embodiment for relaying the target site image to the detector array. The detector array may be in the form of a conventional charged coupled device (CCD), such as typically used in video cameras, for capturing images.

A focusing lens 64 is optically aligned between probe laser 36 and target site 24 for focusing the probe laser beam at the target site. For example, the initial 1.0 mm diameter HeNe laser beam may be focused down to about 0.05 mm in order to improve discrimination between the two reflection beams at the target site for the purpose of measuring the spacing C therebetween.

Notwithstanding rippling of water film 18 during operation which causes the two reflection beams to converge or diverge as shown by dashed lines in FIG. 3, accurate imaging of the source of the reflections can nevertheless be obtained. In this way, an accurate image of the laterally offset two reflected beams may be obtained and suitably measured.

In operation, focusing lens 64 focuses probe beam 38 at target site 24, with the focal length of the lens preferably being exactly equal to the distance between the lens and the target site on the water surface. The focused beam is reflected from the water surface as well as from the interface with the workpiece, with the two reflected beams being captured by imaging lens 62 which relays the image to detector array 40A. This image from the array may then be suitably processed by controller 42 for determining the beam spacing C and in turn the film thickness B.

Imaging lens 62 relays the image of the reflected spots from the water surface and the workpiece surface onto the detector array with a corresponding spacing D between the two reflected images which is substantially unaffected by rippling of the water film. Spacing D of the reflected spots imaged on array 40A is related to the spacing C, measured in air, where the spots are created at the target site by the corresponding magnification value used for imaging lens 62. In this way, using the mathematical expression identified above, the film thickness B may be readily determined from the spacing C of the reflected spots as detected on array 40A with corresponding spacing D.

Accordingly, controller 42 is operatively joined to detector array 40A and is configured with suitable software, for example, to measure the spacing D which, in turn, is indicative of the spacing C between the reflection of the probe beam from the surface of the water film, and the reflection of the beam from the surface of the workpiece below the film at the target site.

Conventional software for analyzing images may be used to identify the two reflection spots sensed by detector array 40A and accurately measure the distance therebetween.

Controller 42 may then be further configured with additional software for determining or calculating the thickness B of water film 18 at the target site from the measured spacing distance D from the mathematical expression identified above and the aforementioned relationship between spacing C, spacing D and the magnification value for imaging lens 62. The controller may then compare the measured thickness B of the film with a stored reference value, such as 0.5 mm, to determine whether the film thickness is sufficient or insufficient for LSP processing.

In a manner similar to that described for the FIG. 1 embodiment, controller 42 may be similarly configured with logic converter 50 and cooperating AND gate 52 for enabling Q-switch driver 46 when sufficient film thickness is measured, with converter 50 providing a logical TRUE value to AND gate 52. When insufficient thickness is measured, logic converter 50 produces a FALSE value for AND gate 52 to disable the Q-switch driver. In this way, pulse laser 20 may be operated in the same manner as described above and with similar advantages, and controlled by measured thickness of water film 18 using the modified form of monitor 34A.

A particular advantage of using imaging lens 62 is that measurement of the film thickness B is relatively unaffected by the specific tilt characteristics of the rippled water surface. The two reflected spots at the target site will be accurately imaged on the focal plane of detector array 40A with a corresponding spacing, regardless of the presence and magnitude of ripples in the water surface, with the spot spacing being determined solely by the magnification of imaging lens 62.

An additional advantage of this monitor is that regardless of the roughness or diffuseness of the workpiece surface, some of the light scattered therefrom will always pass into imaging lens 62 and be imaged on the detector array for detection. Accordingly, even non-specular, or rough, surfaces can be processed and monitored in this manner.

The sensitivity of monitor 34A is variable and scalable by the selection of the particular imaging lens 62, and the spacing between the workpiece and detector array 40A. Increasing the sensitivity and accuracy for measuring film thickness is readily effected by making the focal length of imaging lens 62 correspondingly larger, and the spacing between the workpiece and detector array 40A correspondingly larger.

Additional advantage may be obtained by incorporating an adjustable aperture 66 optically aligned between detector array 40A and imaging lens 62. This aperture may be used to adjust the relative brightness, on the array, of the beam component reflected by the water surface and the component reflected by the workpiece. The specular reflection from the water surface is typically significantly brighter than the reflection from the workpiece, and the relative brightness thereof may be adjusted by aperture 66 for improving the discrimination, and measurement of the spacing, between the relections. If desired, the brightness of either reflected spot may be attenuated by interposing a conventional neutral density filter between the desired reflected spot and lens 62.

In yet another embodiment, a telecentric lens may be used to replace imaging lens 62. A lens that is telecentric in image space does not vary the image spacing at detector array 40A as a function of the focus distance. In this way, measurement of the spacing between the two detected spots on detector array 40A is insensitive to focus position. This advantage may be used for reducing measurement variation due to errors in establishing of the monitor setup.

Testing of a monitor configured in conformance with FIG. 3 accurately measured water layer thickness in the range of about 0.1 mm to about 1.5 mm notwithstanding water rippling. Accordingly, such a monitor may be effectively incorporated in the LSP system illustrated in FIG. 1 for enabling and disabling Q-switch driver 46 and controlling operation of pulse laser 20, thereby ensuring suitable film thickness during real time LSP processing for substantially increasing the processing rate with optimum performance of the pulse laser itself.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A system for laser shock peening a workpiece having a confinement fluid film thereover, comprising:
    a peening laser for projecting a pulsed laser beam at a target site on said fluid film atop said workpiece, wherein said peening laser includes an optically pumped laser rod and a Q-switch for generating said pulsed beam at a pulse repetition rate, said peening laser further including a driver for said Q-switch;
    a monitor to monitor said film at said target site, said monitor including a probe laser for projecting a probe laser beam at said target site and an optical detector optically aligned with said target site for detecting reflection of said probe beam therefrom;
    a controller operatively coupled to said peening laser and detector for initiating said pulsed laser beam in response to quality of said monitored film, said controller being operatively coupled to said Q-switch for emitting said pulsed beam in response to the quality of said monitored film, said controller being configured to enable said driver when said detector detects that quality of said film is normal and to disable said driver when said detector detects that quality of said film is abnormal;
    a master clock for producing a clock signal to effect said pulse rate; and
    a logical AND gate operatively coupled to said detector and said Q-switch driver for enabling said driver when said detector produces a relatively high voltage and disabling said driver when said detector produces a relatively low voltage.

2. A system according to claim 1 further comprising:
    a plurality of optical detectors in a plane array for detecting images; and
    an imaging lens optically aligned between said array of optical detectors and said target site for focusing an image of said target site on said array of optical detectors.

3. A system according to claim 2 wherein said controller is configured for measuring distance between a first reflection of said probe beam from the surface of said film and a second reflection of said probe beam from the surface of said workpiece below said film.

4. A system according to claim 3 wherein said controller is configured for determining thickness of said film at said target site from the measured distance, and for enabling said Q-switch driver when film thickness is sufficient to conduct efficient peening and disabling said Q-switch driver when film thickness is insufficient to conduct efficient peening.

5. A system according to claim 3, further comprising a focusing lens optically aligned between said probe laser and said target site for focusing said probe beam at said target site.

6. A system according to claim 5 wherein said imaging lens comprises a plurality of cooperating lenses for inverting said target site image on said detection array.

7. A system for laser shock peening a workpiece having a confinement fluid film thereover comprising:
 a peening laser for projecting a pulsed laser beam at a target site on said fluid film atop said workpiece, wherein said peening laser includes an optically pumped laser rod and a Q-switch for generating said pulsed beam at a pulse repetition rate, and wherein said peening laser further includes a driver for said Q-switch:
 a monitor to monitor said film at said target site, said monitor including a probe laser for projecting a probe laser beam at said target site and an optical detector optically aligned with said target site for detecting reflection of said probe beam therefrom;
 a controller operatively coupled to said peening laser and detector for initiating said pulsed laser beam in response to quality of said monitored film, said controller being operatively coupled to said Q-switch for emitting said pulsed beam in response to quality of said monitored film, said controller being configured to enable said driver when said detector detects that quality of said film is normal and to disable said driver when said detector detects that quality of said film is abnormal;
 a master clock for producing a clock signal to effect said pulse rate;
 a focusing lens optically aligned between said detector and said target site;
 a pinhole aperture optically aligned between said detector and said lens; and
a band-pass optical filter optically aligned between said detector and said aperture.

8. A system according to claim 7 wherein said pulse repetition rate of said peening laser is at least 10 cycles per second.

* * * * *